United States Patent
Kohler

[11] 3,846,000
[45] Nov. 5, 1974

[54] WIPER BEARING FOR A WINDSHIELD WIPER FOR MOTOR VEHICLES

[75] Inventor: Alfred Kohler, Bietighein, Wurttemberg, Germany

[73] Assignee: SWF Spezialfabrik Fur Autozubehor Gustav Rau GMBH, Bietighein, Germany

[22] Filed: Sept. 7, 1971

[21] Appl. No.: 178,140

[30] Foreign Application Priority Data
Mar. 11, 1971 Germany............... G 71 09 168.4

[52] U.S. Cl. ............................................ 308/238
[51] Int. Cl. ......................................... F16c 33/20
[58] Field of Search ............... 308/238, 241; 15/250

[56] References Cited
UNITED STATES PATENTS

| | | | |
|---|---|---|---|
| 3,502,380 | 3/1970 | Adinoff | 308/238 |
| 2,775,793 | 1/1957 | Cotchett | 308/238 |
| 2,752,210 | 6/1956 | Clark et al. | 308/238 |
| 3,108,830 | 10/1963 | Fierstine | 308/238 |
| 2,678,474 | 5/1954 | Butler | 308/238 |
| 3,031,202 | 4/1962 | Melton et al. | 308/238 |
| 3,072,448 | 1/1963 | Melton et al. | 308/238 |

FOREIGN PATENTS OR APPLICATIONS

| | | | |
|---|---|---|---|
| 861,445 | 2/1961 | Great Britain | 308/238 |
| 1,961,946 | 12/1968 | Germany | 308/238 |

Primary Examiner—Charles J. Myhre
Assistant Examiner—Barry Grossman
Attorney, Agent, or Firm—McGlew and Tuttle

[57] ABSTRACT

A wiper bearing for a windshield wiper of a motor vehicle includes a fixed metal bearing brush which is adapted to be threaded into a mounting sleeve on the vehicle. A wiper shaft is supported in the sleeve to extend to the vehicle exterior at one end and provide a rotatable connection for the wiper blade. The opposite end extends into the vehicle and is connected to a driving crank. The shaft is provided with a plastic coating which is rotatably supported on two axially spaced plastic bushes held at fixed spaced axial locations within the fixed metal bushing.

7 Claims, 1 Drawing Figure

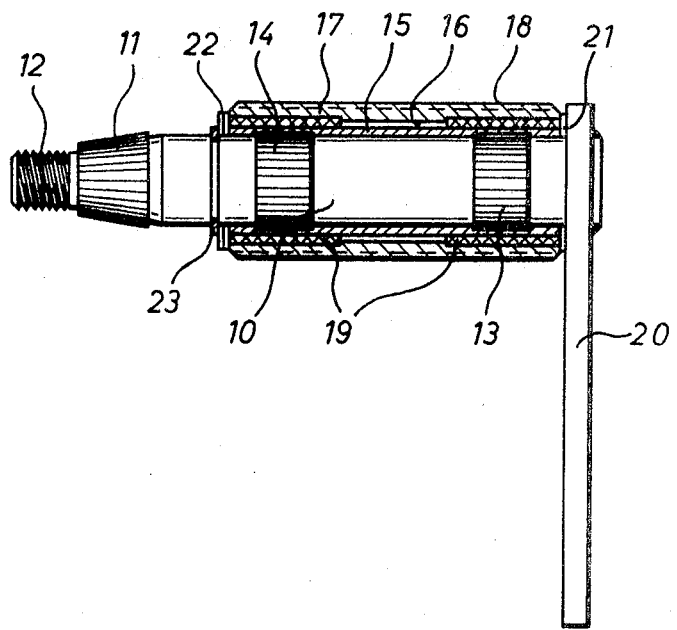

WIPER BEARING FOR A WINDSHIELD WIPER FOR MOTOR VEHICLES

BACKGROUND OF THE INVENTION

1. FIELD OF THE INVENTION

This invention relates in general to windshield wiper blades and, in particular to a new and useful wiper bearing for a windshield wiper for motor vehicles, which includes a wiper shaft with drive crank rotatably mounted in a bearing bush and which carries the wiper arm.

2. DESCRIPTION OF THE PRIOR ART

In the known wiper bearings for windshield wipers, a bearing bush is secured in the body of the vehicle which receives the rotatably but axially non-displaceable wiper shaft. One end of the wiper shaft projects from the body of the car and carries the wiper arm non-rotatably. The other end of the wiper shaft is covered by the car body and carries a drive crank which is coupled with a hinge rod of the lever system. This rotary support between the metal wiper arm and the metal bearing bush is constantly exposed to the environmental conditions. It is unavoidable that moisture penetrating into the wiper bearing will increase the bearing friction, particularly since the surfaces of the bearing rubbing on each other will be roughened after prolonged operation.

SUMMARY OF THE INVENTION

The invention provides a wiper bearing with bearing properties which cannot be impaired by moisture penetration and with good bearing properties which are maintained even after prolonged operation. This is achieved according to the invention by arranging on the wiper shaft at least in the range of the bearing bush a plastic coating. The coated shaft is rotatably mounted in a metal bearing bush on at least one plastic intermediate sleeve carried on the metal bush. This support requires no expensive construction and results in an absolutely constant bearing friction, since only plastic parts slide on one another. The plastic coat of the wiper shaft and the plastic intermediate sleeve are preferably made of abrasion-resistant, preferably different plastic material. This way the bearing friction can be kept low, and seizing of the bearing parts is avoided.

There are different ways of applying the plastic coating on the wiper shaft. Thus, the wiper shaft can be sprayed with a plastic coat in the range of the bearing bush. It is also possible to press a plastic sleeve on the wiper shaft which is of a length comparable to the bearing bush. The hold of this sleeve can be improved by providing the wiper shaft with a circumferential knurl at least in the range of the bearing bush.

A particularly advantageous embodiment of the new wiper bearing is characterized in that the wiper shaft is rotatably mounted in the metal bearing bush on two plastic intermediate sleeves or bushes arranged at axially spaced locations from each other, and that these intermediate sleeves are held by offsets formed in the inner bore of the bearing bush in this distance from each other. The intermediate bearing bushes are located between the end faces of the intermediate sleeve and are axially spaced apart from each other to form a lubricating chamber therebetween which can receive a resistant lubricant when the wiper bearing is assembled.

Accordingly, it is an object of the invention to provide a wiper bearing for a windshield wiper which includes a wiper shaft having a plastic coating which is supported on at least one plastic bushing for relatively low frictional rotational support and which preferably includes means defining a lubricating chamber around the plastic coating.

A further object of the invention is to provide a windshield wiper bearing which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

The only FIGURE of the drawing is an axial sectional view of a wiper bearing constructed in accordance with the invention.

GENERAL DESCRIPTION OF THE PREFERRED EMBODIMENT

Referring to the drawing in particular, the invention embodied therein comprises, a windshield wiper shaft 10 which is axially fixed in a metal bearing bush 17. The right end of wiper shaft 10 carries a drive crank 20 with which is coupled the hinge rod of a wiper lever system (not shown). This crank 20 bears through a disc 21 on the end face of the bearing bush 17. The left end of wiper shaft 10 is supported by a disc 22 and a safety ring 23 engaging an annular groove of wiper shaft 10 on the end face of bearing bush 17. The left end of wiper shaft 10 is designed as a stop cone 11 for the non-rotatable fastening of the wiper arm and has a threaded extension 12 for the locking nut (not shown).

In the range of bearing bush 17, the wiper shaft carries two circumferential knurls 13 and 14 designed as collars. On these knurls 13 and 14 is applied a plastic sleeve or coating 15 which is thus non-rotatably connected with wiper shaft 10. The sleeve 15 may be applied by press-fitting a thin sleeve onto the shaft 10 or by spraying a coating to form a sleeve of plastic around the shaft. This plastic sleeve 15 is mounted for free rotation in two plastic intermediate sleeves 19 which are inserted in the two recessed end faces of metal bearing bush 17. The inner bore of bearing bush 17 is recessed or offset to form engagement recesses to hold these intermediate sleeves 19 in a predetermined axial spacing. It is also ensured that these intermediate sleeves 19 do not project beyond the end faces of bearing bush 17. These intermediate sleeves 19 are preferably mounted non-rotatably in bearing bush 17 so that bearing friction can only appear between the surfaces of the plastic sleeve 15 and the plastic intermediate sleeves 19. The two plastic intermediate sleeves 19 are axially spaced apart so that a lubricating chamber 16 for receiving a lubricant is formed therebetween.

Bearing bush 17 carries a male thread 18 to permit it to be engaged by and locked by means of locking nuts after it is arranged in a bore of the body of the vehicle.

While a specific embodiment of the invention has been shown and described in detail to illustrate the application of the principles of the invention, it will be understood that the invention may be embodied otherwise without departing from such principles.

What is claimed is:

1. Wiper drive for a windshield wiper for motor vehicles, comprising a bearing bush have a bore with two intermediate plastic sleeve therein, a wiper shaft for a wiper arm having a drive crank and being rotatably mounted in said plastic sleeve within said bearing bush, said wiper shaft having a plastic coat non-rotatably secured thereto at least in the range of said sleeve of said bearing bush said two plastic intermediate sleeves being arranged in axially spaced relationship to each other, the inner bore of the bearing bush having recesses at each end in which said sleeves are respectively engaged said plastic plastic coat and said bearing bush extending between the end faces of said sleeves, and a lubricating chamber formed between said sleeves.

2. Wiper bearing for a windshield wiper for motor vehicles, according to claim 1, wherein said wiper shaft plastic coat is a plastic spray coat.

3. Wiper bearing for a windshield wiper for motor vehicles, according to claim 1, wherein said coat is a plastic sleeve non-rotatably affixed to said wiper shaft.

4. Wiper bearing for a windshield wiper for motor vehicles, according to claim 1, wherein said plastic coat of said wiper shaft and said plastic intermediate sleeves comprise abrasion-resistant, preferably different plastic materials.

5. Wiper bearing for a windshield wiper for motor vehicles, according to claim 1, wherein said plastic intermediate sleeves are locked non-rotatably in said metal bearing bush.

6. A wiper drive construction comprising a drive crank having a wiper shaft, said wiper shaft having two axially spaced circumferentially extending raised knurled areas, a plastic bearing surface extending over said shaft between and over said knurled areas and non-rotatably affixed to said wiper shaft and said knurled areas, a bearing bush surrounding said wiper shaft having two sets of axially spaced recesses, a plastic bush sleeve in each recess affixed to said bush for rotation thereof and projecting inwardly from said bearing bush into rotatable engagement with said plastic bearing surface for rotatably supporting said bush on said wiper shaft and defining a lubricating chamber between adjacent ends thereof over said bearing surface.

7. A wiper drive construction according to claim 6, wherein said wiper shaft includes an annular groove, a disc carried on said shaft between said groove and the end of said bush, and a safety ring engaged in said groove and bearing against said disc and holding it against said bush.

* * * * *